United States Patent
Sugiyama et al.

(10) Patent No.: US 7,989,116 B2
(45) Date of Patent: Aug. 2, 2011

(54) ELECTROLYTE UTILIZING A LEWIS ACID/BRONSTEAD ACID COMPLEX

(75) Inventors: Yuichiro Sugiyama, Aichi (JP); Hisashi Yamamoto, Chicago, IL (US)

(73) Assignees: Toyota Motor Engineering & Manufacturing North America, Inc., Erlanger, KY (US); University of Chicago, Chicago, IL (US)

( * ) Notice: Subject to any disclaimer, the term of this patent is extended or adjusted under 35 U.S.C. 154(b) by 1118 days.

(21) Appl. No.: 11/745,782

(22) Filed: May 8, 2007

(65) Prior Publication Data

US 2008/0280179 A1 Nov. 13, 2008

(51) Int. Cl.
*H01M 8/10* (2006.01)

(52) U.S. Cl. .................. 429/491; 429/492; 429/493

(58) Field of Classification Search ........... 429/491–494
See application file for complete search history.

(56) References Cited

U.S. PATENT DOCUMENTS

| | | |
|---|---|---|
| 3,592,696 A | 7/1971 | Palmer |
| 5,475,069 A | 12/1995 | Drysdale |
| 5,580,681 A | 12/1996 | Fleischer et al. |
| 5,849,432 A | 12/1998 | Angell et al. |
| 5,876,587 A | 3/1999 | Horbez et al. |
| 5,916,485 A | 6/1999 | Besenhard et al. |
| 6,025,096 A | 2/2000 | Hope |
| 6,066,444 A | 5/2000 | Fujita et al. |
| 6,225,009 B1 * | 5/2001 | Fleischer et al. ............ 429/306 |
| 6,383,682 B1 * | 5/2002 | Amatucci .................... 429/188 |
| 2004/0247974 A1 * | 12/2004 | Uensal et al. ................ 429/33 |
| 2006/0052521 A1 * | 3/2006 | O'Brien ...................... 524/588 |

FOREIGN PATENT DOCUMENTS

| | | |
|---|---|---|
| JP | 10 302838 A | 11/1998 |
| JP | 2002 033130 A | 1/2002 |
| JP | 2004 171907 A | 6/2004 |
| JP | 2006 318674 A | 11/2006 |
| WO | 95/07555 A1 | 3/1995 |
| WO | 97/49106 A1 | 12/1997 |
| WO | 01/98396 A1 | 12/2001 |
| WO | 03/043102 A2 | 5/2003 |

OTHER PUBLICATIONS

Electrochem.Soc, May 2001, Hasiotis, C et al., 148:A513-A519.
Solid St. Ionic, 1993, Bernson et al., 60:31-36.

* cited by examiner

*Primary Examiner* — Patrick Ryan
*Assistant Examiner* — Muhammad Siddiquee
(74) *Attorney, Agent, or Firm* — Gifford, Krass, Sprinkle, Sprinkle, Anderson & Citkowski, P.C.

(57) ABSTRACT

A proton conducting polymer is described herein which generally comprises a proton donating polymer and a Lewis acid. The Lewis acids may comprise one or more rare earth triflates. The proton conducting polymer exhibits excellent proton conductivity in low humidity environments.

20 Claims, 2 Drawing Sheets

ELECTROLYTE UTILIZING A LEWIS ACID/BRONSTEAD ACID COMPLEX

FIELD OF THE INVENTION

The present invention generally relates to proton conducting polymers. More particularly, the present invention relates to proton conducting polymers for use in fuel cells.

BACKGROUND

A fuel cell is an energy conversion device which electrochemically reacts fuels such as hydrogen and oxygen to produce an electrical current. One particular type of a fuel cell is a Proton Exchange Membrane (PEM) fuel cell. PEM fuel cells have an operating temperature of around 80° C. which makes them favorable for a number of applications, particularly automotive applications.

A PEM fuel cell generally comprises one or more electrically connected membrane electrode assemblies (MEA). Each MEA comprises an anode and a cathode separated by a solid electrolyte allowing for the transfer of protons therethrough. The solid electrolyte is typically in the form of a membrane. The MEAs are disposed between flow fields which provide for distribution of hydrogen across the surface of the anode opposite the membrane and the distribution of oxygen across the surface of the cathode opposite the membrane. To catalyze the reactions at the anode and cathode, catalysts are deposited on the surfaces of the electrodes. A typical catalyst used in PEM fuel cells is platinum.

During operation, hydrogen is supplied to the anode and oxygen is supplied to the cathode to produce an electrical current. The hydrogen and oxygen react at the appropriate electrodes via the following reactions:

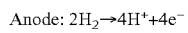
Anode: $2H_2 \rightarrow 4H^+ + 4e^-$

Cathode: $O_2 + 4H^+ + 4e^- \rightarrow 2H_2O$

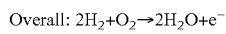
Overall: $2H_2 + O_2 \rightarrow 2H_2O + e^-$

At the anode, hydrogen is dissociated into hydrogen ions and electrons. The hydrogen ions permeate through the membrane to the cathode, while the electrons flow through an external circuit to the cathode. At the cathode, oxygen reacts with the hydrogen ions and electrons to form water. The flow of electrons from the anode to the cathode via the external circuit may be used as a source of power.

The solid electrolyte as utilized in PEM fuel cells is an acidic proton conducting polymer. The acidity of the polymer allows the transfer of protons from the anode to the cathode while preventing the transfer of electrons therethrough. Sulfonated fluoropolymers are the most popular choice for the acidic proton conducting polymers used in PEM fuel cells. One of the most popular of these conductive polymers is Nafion® (registered trademark of DuPont). The popularity of sulfonated fluoropolymers is due to their high chemical resistivity, ability to be formed into very thin membranes, and high conductivity due to their ability to absorb water. The ability of the sulfonated fluoropolymers to absorb large quantities of water is due to the hydrophilic nature of the sulfonic groups within the polymer. The sulfonic groups provide for the creation of hydrated regions within the polymer, which allow the hydrogen ions to move more freely through the polymer due to a weaker attraction to the sulfonic group. The weaker attraction between the hydrogen ions and the sulfonic groups increases the conductivity of the polymer thereby increasing performance of the fuel cell. As such, the conductivity of the hydrogen ions is directly proportional to the amount of hydration of the sulfonated fluoropolymer.

With the hydration of the electrolyte being an important consideration in PEM fuel cells, the humidity of the air in a PEM fuel cell must be carefully monitored and controlled. If the air has too high of a humidity, the cell can become flooded with water created during operation of the fuel cell resulting in a decrease in performance due to clogging of the electrode pores. If the air has too low of a humidity, the electrolyte may dry out thereby decreasing the conductivity of the electrolyte resulting in decreased fuel cell performance. As such, control systems and humidification systems must be used in conjunction with PEM fuel cells. The use of these systems can adversely affect the cost, size, and mass of PEM fuel cell systems. As such, there is a need in the art for proton conducting polymers which exhibit high conductivity in low humidity environments.

SUMMARY OF THE INVENTION

Described herein, is a proton conducting polymer comprising a proton donating polymer and an electron withdrawing species. The electron withdrawing species may comprise a Lewis acid. The Lewis acid may comprise a rare earth triflate. "Triflate", more formally known as trifluoromethanesulfonate, is a functional group with the formula $CF_3SO_3$. As used herein, the group $CF_3SO_3$ may be designated as OTf. Examples of rare earth triflates that may be used in accordance with the present invention include $Sc(OTf)_3$, $Y(OTf)_3$, and $La(OTf)_3$. Other Lewis acids that may be used in accordance with the present invention include $SC(ClO_4)_3$, $Pb(ClO_4)_3$, and $Fe(OSO_2CF_3)_2$.

The proton conducting polymer may exhibit a cationic conductivity greater than 0.015 S/cm at a relative humidity less than 25% at temperatures in the range of 40° C. to 80° C. The proton donating polymer may comprises a sulfonic acid group. The proton conducting polymer may comprise sulfonated polysulfone. Other proton donating polymers that may be used in accordance with the present invention include sulfonated polyether ketones, sulfonated polystyrenes, sulfonated polyphenylenes, sulfonated trifluorostyrenes, sulfonated polyphosphazenes, sulfonated fluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof. Preferably the molar ratio between the proton donating acid groups and the Lewis acid is in the range of 0.1 to 3.0, more preferably 0.2 to 1.2.

Also described herein is a fuel cell comprising an anode, a cathode, and a cationic exchange membrane comprising a proton donating polymer and an electron withdrawing species. The electron withdrawing species may comprise a Lewis acid. The Lewis acid comprises a rare earth triflate. Examples of rare earth triflates that may be used in accordance with the present invention include $Sc(OTf)_3$, $Y(OTf)_3$, and $La(OTf)_3$. Other Lewis acids that may be used in accordance with the present invention include $Sc(ClO_4)_3$, $Pb(ClO_4)_3$, and $Fe(OSO_2CF_3)_2$. The proton conducting polymer may exhibit a cationic conductivity greater than 0.015 S/cm at a relative humidity less than 25% at temperatures in the range of 40° C. to 80° C.

DETAILED DESCRIPTION OF THE DRAWINGS

DETAILED DESCRIPTION OF THE PREFERRED EMBODIMENTS OF THE INVENTION

Figure 1:
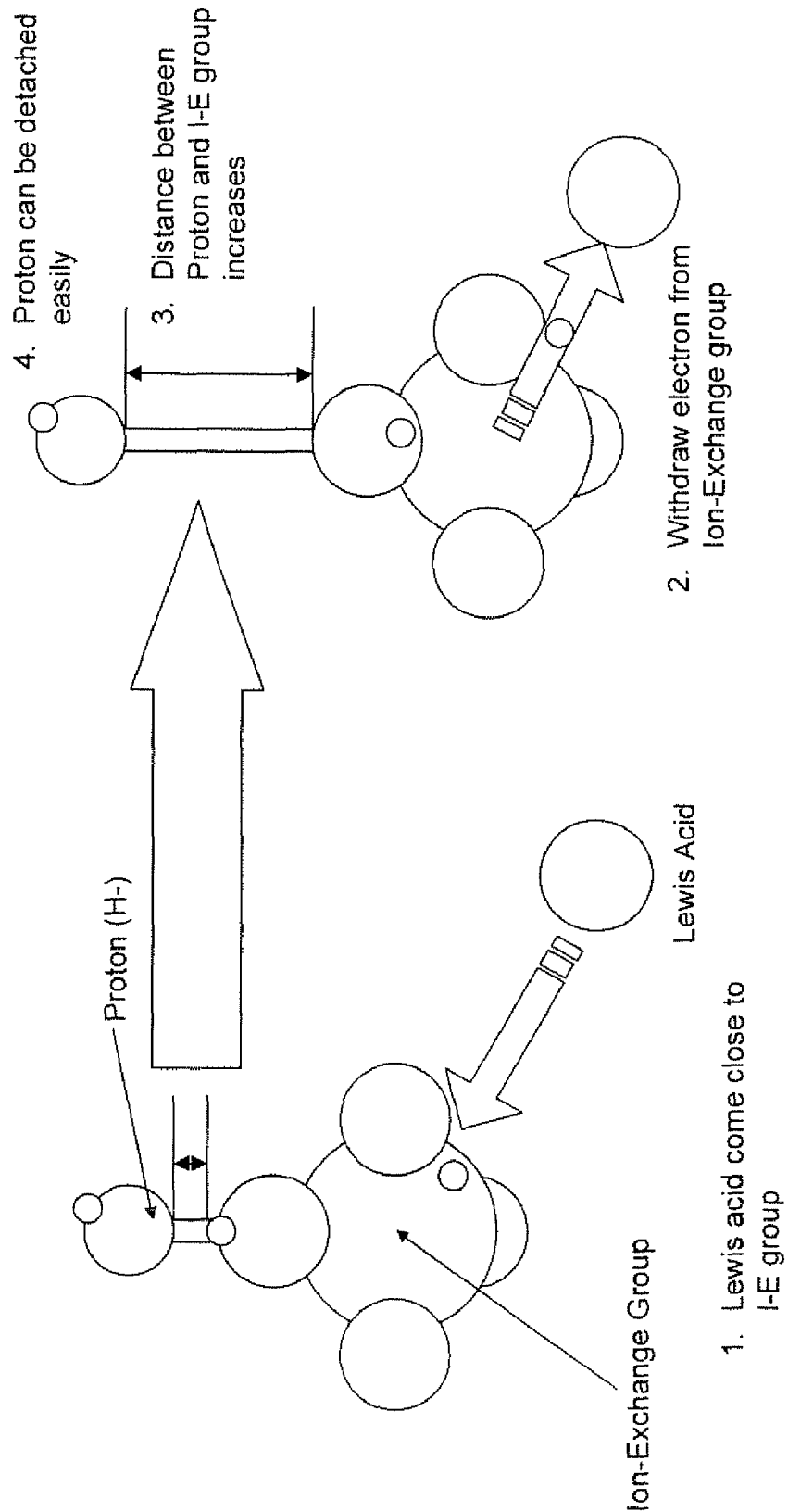
FIG. 1, is a depiction of the mechanism in accordance with the present invention.

Described herein, is a conductive polymer which provides for the transfer of protons therethrough. The proton conducting polymer may be used as the electrolyte in a fuel cell such as a PEM fuel cell, a direct methanol fuel cell, or any other type fuel cell that utilizes a proton conducting material as the electrolyte. The proton conducting polymer provides for high proton conductivity in low humidity environments.

The proton conducting polymer generally comprises a proton donating polymer and an electron withdrawing species. The electron withdrawing species may comprise a Lewis acid. The proton conducting polymer may be doped with the Lewis acid. The ratio of the proton donating polymer to Lewis acid may be determined based on the molar ratio between the proton donating acid groups of the proton donating polymer and the Lewis acid. Preferably the molar ratio between the proton donating acid groups and the Lewis acid is in the range of 0.1 to 3.0, more preferably 0.2 to 1.2.

The Lewis acid may be selected from any type Lewis acid compatible with the proton donating polymer. Some common Lewis acids include aluminum chloride, niobium pentachloride, and many metal ions are strong Lewis acids. However, to enable use in a fuel cell environment, the Lewis acid should not include metal ions which undergo hydrolysis to form basic salts in water. Preferably, the Lewis acid may comprise one or more rare earth triflates. Examples of rare earth triflates that may be used in accordance with the proton conducting polymer include $Sc(OTf)_3$, $Y(OTf)_3$ and $La(OTf)_3$. The Lewis acid may also comprise one or more selected from $Sc(ClO_4)_3$, $Pb(ClO_4)_3$, and $Fe(OSO_2CF_3)_2$. Other Lewis acids that may be used in accordance with the present invention include Lanthanoid triflates, such as $Ce(OTf)_3$, $Pr(OTf)_3$, Lanthanoids and chlorides, such as $ScCl_3$, $YCl_3$, $YbCl_3$, Lanthanoid tetraoxoclorides, such as $Ce(ClO_4)_3$, $Y(ClO_4)_3$, $La(ClO_4)_3$, chlorides containing Fe(II), Cd(II), Pb(II), or other Metal(II) elements, such as $FeCl_2$, tetraoxoclorides containing Fe(II), Cd(II), Pb(II), or other Metal(III) elements, such as $Cu(ClO_4)_3$, $Zr(ClO_4)_3$, $Cd(ClO_4)_2$, $Fe(ClO_4)_2$ and other triflates containing Fe(II), Cd(II), Pb(II), or other Metal(III) elements.

The proton donating polymer may comprise a polymer including a sulfonic acid group or a phosphonic acid group. In particular, the proton donating polymer may comprise sulfonated polysulfone. Other proton donating polymers that may be used in accordance with the present invention include sulfonated polyether ketones, sulfonated polystyrenes, sulfonated polyphenylenes, sulfonated trifluorostyrenes, sulfonated polyphosphazenes, sulfonated fluoropolymers, sulfonated perfluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof. Preferably, the proton donating polymer has an ion exchange capacity greater than 1.0. More preferably, the proton donating polymer has an ion exchange capacity greater than 1.2.

In general, protons move very easily under highly acidic conditions. By adding the Lewis acid to the proton donating polymer, the high acidity of the Lewis acid allows protons to move much more easier through the conductive polymer. Without being bound by theory, the present inventors believe that the high acidity of the Lewis acid withdraws the electron from the proton donating group which allows the hydrogen ion to easily move through the conductive polymer. Once the electron is withdrawn from the proton donating polymer, the electron density of proton donating polymer is moved toward the electron density of the Lewis acid. Since electron density between proton and one or more acid groups of the proton donating polymer may be decreased, ion bonding between proton and the one or more acid groups will weaken thereby allowing the proton to be easily detached. This mechanism is generally depicted in FIG. 1.

Certain Lewis acids, such as those described herein, are stable and are compatible in the humid environment. These Lewis acids can not be decomposed within the fuel cell environment. As such, they can remain "in-situ" within the membrane and/or other polymer electrolyte. This compatibility with an aqueous environment allows the fuel cell to benefit from the high acidity of a Lewis acid.

The proton conducting polymer in accordance with the present invention may be prepared by mixing a proton donating polymer as described herein with a Lewis acid. The proton donating polymer and the Lewis acid may be in powder form and mechanically mixed together. The proton donating polymer and the Lewis acid may also dissolved in solution and mixed together with the solvent being evaporated off to obtain the proton conducting polymer. The proton conducting polymer may also be obtained by dipping the proton donating polymer into a Lewis acid solution with subsequent drying.

The proton conducting polymer may be formed into a membrane as used in electrochemical cells. To obtain a membrane with the proton conducting polymer, the proton donating polymer and the Lewis acid may be combined in solution and allowed to dry. Typically, the proton donating polymer and the Lewis acid may be dissolved in an organic solvent such as N,N-dimethylacetamide (DMAC) or dimethyl sulfoxide (DMSO). Some water may be added to the solution to aid in the dissolution of the Lewis acid. Once all of the proton donating polymer and the Lewis acid are dissolved the solvent is evaporated off to obtain the film. The solution may be heated to aid in dissolution of the proton donating polymer and the Lewis acid. A membrane including the proton conducting polymer may also be obtained by preparing a membrane with the proton donating polymer and impregnating the membrane with the Lewis acid. The membrane may be impregnated with the Lewis acid by dipping the membrane into a Lewis acid solution with subsequent drying, spraying a Lewis acid solution onto the membrane with subsequent drying, or any other generally known deposition techniques.

When utilized as the proton conducting electrolyte in a fuel cell, the proton conducting electrolyte may be formed into an ion-exchange membrane as previously discussed and incorporated into a fuel cell. When incorporated into a fuel cell, the ion-exchange membrane is disposed between and in electrochemical communication with an anode and a cathode. During operation of the fuel cell, protons are transferred through the ion-exchange membrane from the anode to the cathode while electrons are transferred through an external circuit from the anode to the cathode.

The ion-exchange membrane formed from the proton conducting polymer of the present invention may be utilized in a membrane electrode assembly (MEA). A MEA includes an anode, a cathode, and an ion-exchange membrane according disposed between the anode and cathode. One or more of the membrane electrode assemblies according to the present invention may be used in a fuel cell or other apparatus.

EXAMPLE

A proton conducting polymer sample was prepared in accordance with the present invention. To prepare the polymer sample, 0.816 g of sulfonated polysulfone powder, and 1.2 g of scandium triflate powder were mixed with 1.0 ml water. The mixture ratio between sulfonated polysulfone and the scandium triflate were calculated on the basis Lewis acid/-SO3H molecular ratio of 0.5. Additional water was 1-3 g, that was depended on the condition of samples. After the mixtures were prepared, the mixtures were dried to obtain powder samples.

Figure 2:
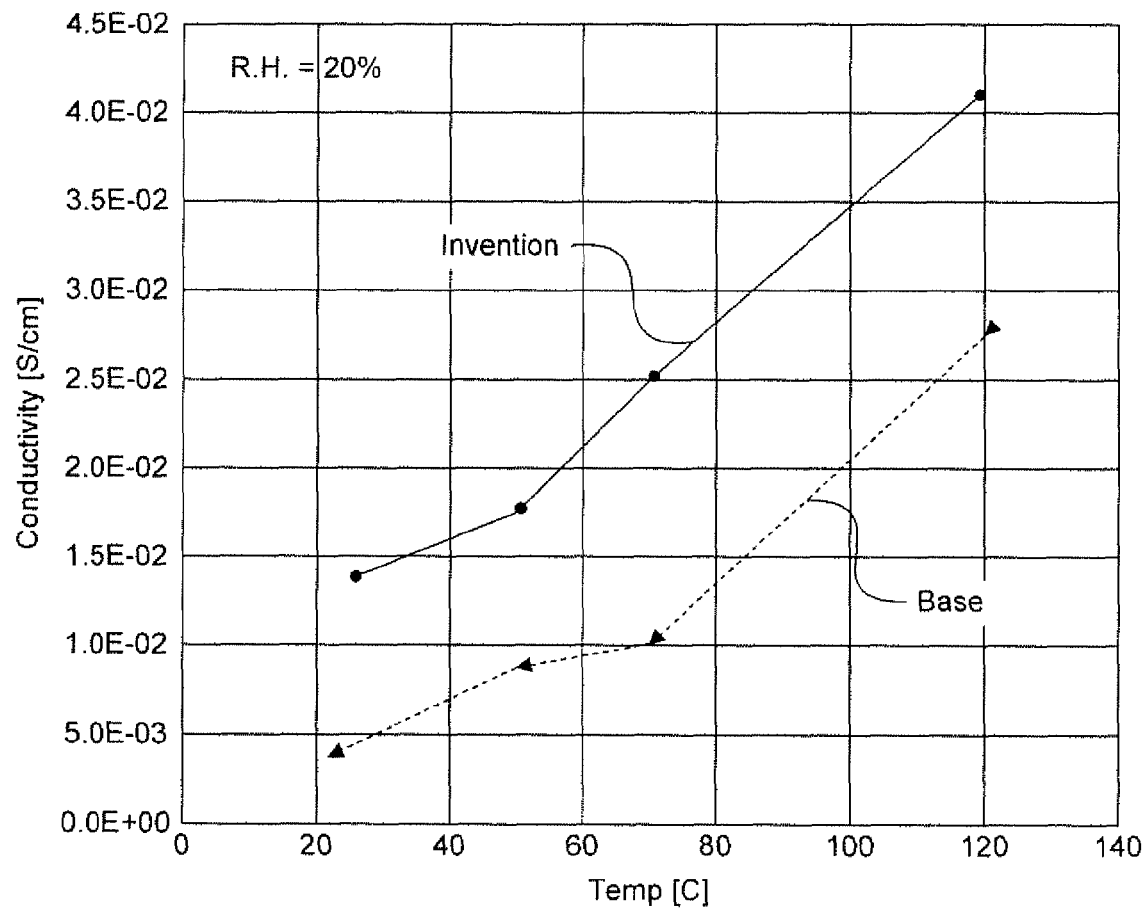
FIG. 2, is a plot showing the conductivity of the proton conducting polymer in accordance with the present invention as compared to sulfonated polysulfone.

A testing pellet was created by die-casting approximately 0.5 g-1.0 g of prepared powder sample with a load was 1 t/cm². A second pellet was created by die-casting approximately 0.5 g to 1.0 g of powder sulfonated polysulfone. The pellets had a height of approximately 10 mm and a thickness of about 1.5 mm. Each pellet was separately placed in a temperature-humidity chamber which maintained a relative humidity of 20%. Ionic conductivity of the pellets were individually measured by the alternating current impedance (AC impedance) method. During testing, an electrical current was applied across each pellet via platinum electrodes in contact with the pellet. The ionic conductivity of the pellets was then measured at temperatures varying from 20° C. to 120° C. The results of the experiment are shown in FIG. 2.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A proton conducting polymer comprising:
in combination, a proton donating polymer wherein said proton donating polymer is selected from one or more from the group consisting of sulfonated polysulfones, sulfonated polyether ketones, sulfonated polystyrenes, sulfonated polyphenylenes, sulfonated trifluorostyrenes, sulfonated polyphosphazenes, sulfonated fluoropolymers, sulfonated perfluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof and a Lewis acid, wherein said Lewis acid is selected from one or more of the group consisting of $Sc(OTf)_3$, $Y(OTf)_3$, $La(OTf)_3$, $Sc(ClO_4)_3$, $Pb(ClO_4)_3$, and $Fe(OSO_2CF_3)_2$, $Ce(OTf)_3$, $Pr(OTf)_3$, $ScCl_3$, $YCl_3$, $YbCl_3$, $Ce(ClO_4)_3$, $Y(ClO_4)_3$, $La(ClO_4)_3$, $Cu(ClO_4)_3$, $Zr(ClO_4)_3$, $Cd(ClO_4)_2$, $Fe(ClO_4)_2$, and $FeCl_2$.

2. The proton conducting polymer according to claim 1, wherein said proton donating polymer is doped with said Lewis acid.

3. The proton conducting polymer according to claim 1, wherein the molar ratio between the proton donating acid groups of said proton donating polymer and said Lewis acid is in the range of 0.1 to 3.0.

4. The proton conducting polymer according to claim 1, wherein the molar ratio between the proton donating acid groups of said proton donating polymer and said Lewis acid is in the range of 0.2 to 1.2.

5. The proton conducting polymer according to claim 1, wherein said Lewis acid is stable in a humid environment.

6. The proton conducting polymer according to claim 1, wherein said proton conducting polymer exhibits a cationic conductivity greater than 0.015 S/cm at a relative humidity less than 25% at temperatures in the range of 40° C. to 80° C.

7. A fuel cell comprising:
an anode;
a cathode;
and a cationic exchange membrane comprising in combination a proton donating polymer wherein said proton donating polymer is selected from one or more from the group consisting of sulfonated polysulfones, sulfonated polyether ketones, sulfonated polystyrenes, sulfonated polyphenylenes, sulfonated trifluorostyrenes, sulfonated polyphosphazenes, sulfonated fluoropolymers, sulfonated perfluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof and a Lewis acid, wherein said Lewis acid is selected from one or more of the group consisting of $Sc(OTf)_3$, $Y(OTf)_3$, $La(OTf)_3$, $Sc(ClO_4)_3$, $Pb(ClO_4)_3$, and $Fe(OSO_2CF_3)_2$, $Ce(OTf)_3$, $Pr(OTf)_3$, $ScCl_3$, $YCl_3$, $YbCl_3$, $Ce(ClO_4)_3$, $Y(ClO_4)_3$, $La(ClO_4)_3$, $Cu(ClO_4)_3$, $Zr(ClO_4)_3$, $Cd(ClO_4)_2$, $Fe(ClO_4)_2$, and $FeCl_2$.

8. The fuel cell according to claim 7, wherein said proton donating polymer is doped with said Lewis acid.

9. The fuel cell according to claim 7, wherein the molar ratio between the proton donating acid groups of said proton donating polymer and said Lewis acid is in the range of 0.5 to 3.0.

10. The fuel cell according to claim 7, wherein the molar ratio between the proton donating acid groups of said proton donating polymer and said Lewis acid is in the range of 1.5 to 2.5.

11. The fuel cell according to claim 7, wherein said Lewis acid is stable in a humid environment.

12. The fuel cell according to claim 7, wherein said proton conducting polymer exhibits a cationic conductivity greater than 0.015 S/cm at a relative humidity less than 25% at temperatures in the range of 40° C. to 80° C.

13. A proton conducting polymer comprising in combination a proton donating polymer wherein said proton donating polymer is selected from one or more from the group consisting of sulfonated polysulfones, sulfonated polyether ketones, sulfonated polystyrenes, sulfonated polyphenylenes, sulfonated trifluorostyrenes, sulfonated polyphosphazenes, sulfonated fluoropolymers, sulfonated perfluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof and a Lewis acid, wherein said Lewis acid is selected from one or more of the group consisting of $Sc(OTf)_3$, $Y(OTf)_3$, $La(OTf)_3$, $Sc(ClO_4)_3$, $Pb(ClO_4)_3$, and $Fe(OSO_2CF_3)_2$, $Ce(OTf)_3$, $Pr(OTf)_3$, $ScCl_3$, $YCl_3$, $YbCl_3$, $Ce(ClO_4)_3$, $Y(ClO_4)_3$, $La(ClO_4)_3$, $Cu(ClO_4)_3$, $Zr(ClO_4)_3$, $Cd(ClO_4)_2$, $Fe(ClO_4)_2$, and $FeCl_2$, said proton conducting polymer having a cation conductivity greater that 0.015 S/cm at a relative humidity less than 25% at temperatures in the range of 40° C. to 80° C.

14. The proton conducting polymer according to claim 13, wherein said Lewis acid is stable in a humid environment.

15. An electrolyte membrane comprising in combination a proton donating polymer wherein said proton donating polymer is selected from one or more from the group consisting of sulfonated polysulfones, sulfonated polyether ketones, sulfonated polystyrenes, sulfonated polyphenylenes, sulfonated trifluorostyrenes, sulfonated polyphosphazenes, sulfonated fluoropolymers, sulfonated perfluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof and a Lewis acid, wherein said Lewis acid is selected from one or more of the group consisting of $Sc(OTf)_3$, $Y(OTf)_3$, $La(OTf)_3$, $Sc(ClO_4)_3$, $Pb(ClO_4)_3$, and $Fe(OSO_2CF_3)_2$, $Ce(OTf)_3$, $Pr(OTf)_3$, $ScCl_3$, $YCl_3$, $YbCl_3$, $Ce(ClO_4)_3$, $Y(ClO_4)_3$, $La(ClO_4)_3$, $Cu(ClO_4)_3$, $Zr(ClO_4)_3$, $Cd(ClO_4)_2$, $Fe(ClO_4)_2$, and $FeCl_2$.

16. The electrolyte membrane according to claim 15, wherein said proton donating polymer is doped with said Lewis acid.

17. The electrolyte membrane according to claim 15, wherein the molar ratio between the proton donating acid groups of said proton donating polymer and said Lewis acid is in the range of 0.1 to 3.0.

18. The electrolyte membrane according to claim 15, wherein the molar ratio between the proton donating acid groups of said proton donating polymer and said Lewis acid is in the range of 0.2 to 1.2.

19. The electrolyte membrane according to claim 15, wherein said Lewis acid is stable in a humid environment.

20. The electrolyte membrane according to claim 15, wherein said proton conducting polymer exhibits a cationic conductivity greater than 0.015 S/cm at a relative humidity less than 25% at temperatures in the range of 40° C. to 80° C.

* * * * *